(12) United States Patent
You et al.

(10) Patent No.: US 8,078,874 B2
(45) Date of Patent: Dec. 13, 2011

(54) METHOD AND APPARATUS FOR TRANSMITTING DATA USING AUTHENTICATION

(75) Inventors: Yong-kuk You, Seoul (KR); Seong-soo Kim, Seoul (KR); Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 997 days.

(21) Appl. No.: 11/942,884

(22) Filed: Nov. 20, 2007

(65) Prior Publication Data

US 2008/0133918 A1 Jun. 5, 2008

Related U.S. Application Data

(60) Provisional application No. 60/872,505, filed on Dec. 4, 2006.

(30) Foreign Application Priority Data

Apr. 5, 2007 (KR) .......................... 10-2007-0033777

(51) Int. Cl.
*H04L 9/00* (2006.01)
(52) U.S. Cl. ........................................... 713/175
(58) Field of Classification Search .................. 713/168, 713/169, 175, 156, 170, 176, 180, 181
See application file for complete search history.

(56) References Cited

U.S. PATENT DOCUMENTS

| | | | |
|---|---|---|---|
| 6,058,478 A | 5/2000 | Davis | |
| 6,073,236 A | 6/2000 | Kusakabe et al. | |
| RE36,946 E * | 11/2000 | Diffie et al. | 380/278 |
| 2004/0250073 A1 | 12/2004 | Cukier et al. | |
| 2006/0031936 A1* | 2/2006 | Nelson et al. | 726/23 |
| 2008/0155260 A1* | 6/2008 | Perez et al. | 713/169 |
| 2008/0232338 A1* | 9/2008 | Ji et al. | 370/338 |
| 2009/0063863 A1* | 3/2009 | Durand et al. | 713/171 |

FOREIGN PATENT DOCUMENTS

| | | |
|---|---|---|
| EP | 1 526 433 A1 | 4/2005 |
| JP | 2006-109518 A | 4/2006 |
| KR | 10-2005-0007830 A | 1/2005 |

OTHER PUBLICATIONS

European Search Report, dated Aug. 8, 2011, issued in Application No. 07834149.2.
European Examination Report, dated Aug. 30, 2011, issued in Application No. 07834149.2.
Mohammad Abdul Azim, et al., "An Efficient Elliptic Curve Cryptography based Authenticated Key Agreement Protocol for Wireless LAN Security", High Performance Switching and Routing, 2005, pp. 376-380.

* cited by examiner

*Primary Examiner* — Beemnet Dada
(74) *Attorney, Agent, or Firm* — Sughrue Mion, PLLC

(57) ABSTRACT

A method and apparatus of transmitting data using authentication between a first device and a second device are provided. The method includes transmitting an encrypted certificate of the first device using a shared key shared by the first device and the second device, receiving authentication key generation information for generating an authentication key, which is received when it is determined that the certificate of the first device is valid and not revoked, generating a first random number and generating an authentication key based on the first random number and the authentication key generation information, and encrypting and transmitting data using the authentication key.

24 Claims, 3 Drawing Sheets

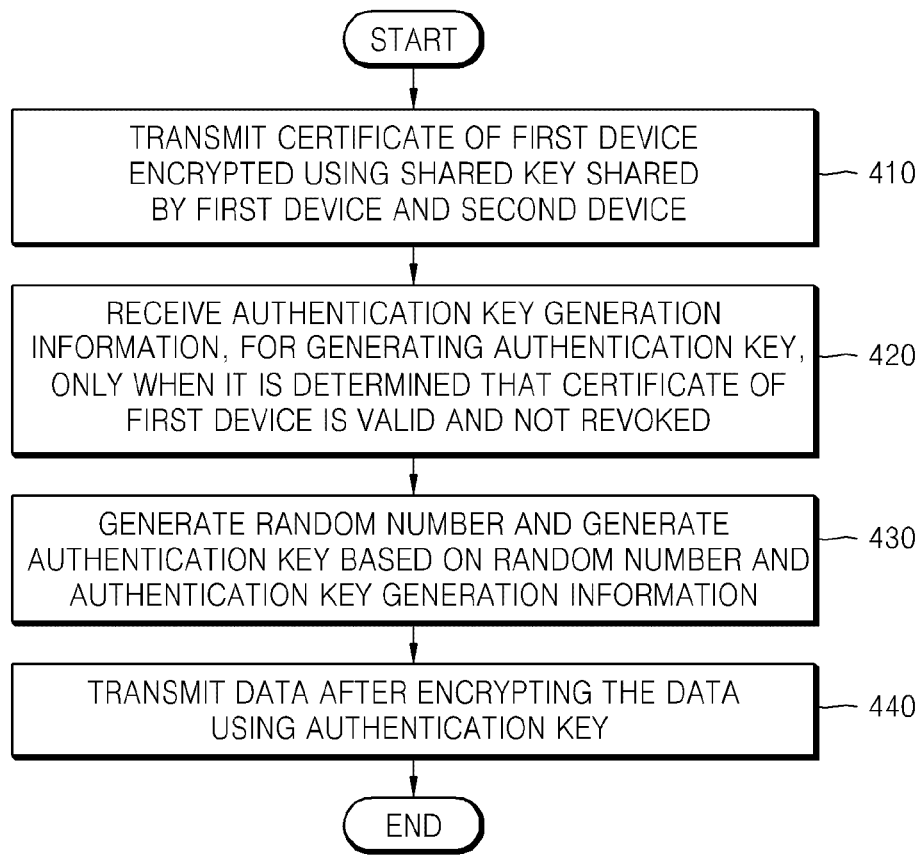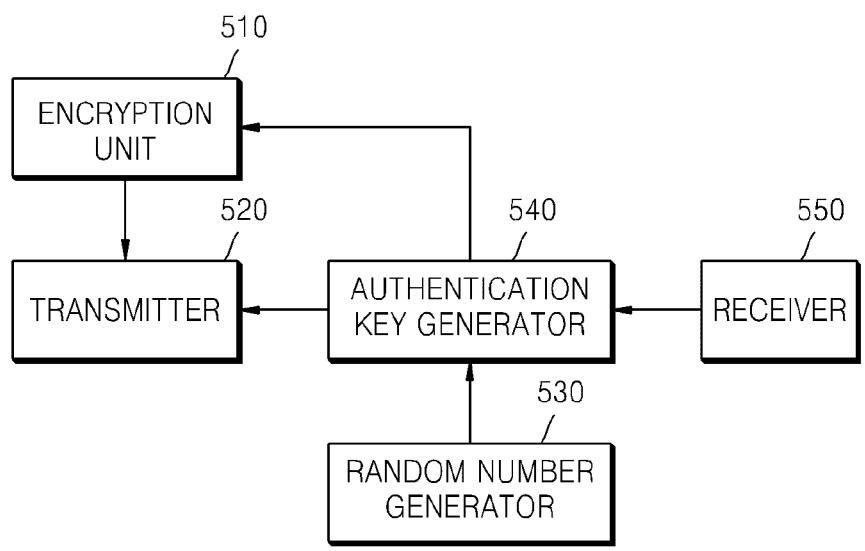

METHOD AND APPARATUS FOR TRANSMITTING DATA USING AUTHENTICATION

CROSS-REFERENCE TO RELATED PATENT APPLICATIONS

This application claims priority from U.S. Patent Application No. 60/872,505, filed on Dec. 4, 2006, in the U.S. Patent and Trademark Office, and Korean Patent Application No. 10-2007-0033777, filed on Apr. 5, 2007, in the Korean Intellectual Property Office, the disclosures of which are incorporated herein in their entirety by reference.

BACKGROUND OF THE INVENTION

1. Field of the Invention

Methods consistent with the present invention relate to transmitting data using authentication between a first device and a second device.

2. Description of the Related Art

A digital transmission content protection (DTCP) of the Digital Transmission Licensing Administrator (DTLA) (http://www.dtcp.com/) was first developed as a protocol for protecting audio/video (AV) data transmitted between devices based on the Institute of Electrical and Electronics Engineers (IEEE) 1394 standard. The DTCP has since been expanded to support standards for universal serial bus (USB), Media Oriented Systems Transport (MOST), Bluetooth, and Internet protocol (IP). In general, a method of transmitting compressed AV data can be used for any type of data, regardless of the purpose of the transmission or the content format.

Recently, there have been increasing demands for transmitting and receiving uncompressed AV data via a wireless transceiving system having a transmission rate of several Gbps, using the tens of GHz band (for example, 4 Gbps at 60 GHz), and thus research into this field has been very active.

DTCP can be applied to this field, and here, an encrypting algorithm must be very fast, since a large amount of data is transmitted. Also, when DTCP is applied to an 802.11 wireless LAN environment, wired equivalent privacy (WEP), which is a method of protecting data in the 802.11 standard, or a corresponding method of protecting data, such as Wi-Fi protected access (WPA) or WPA2, should be used before authenticating DTCP or transmitting content protected by DTCP.

WEP is a method of transmitting and receiving encrypted data between a client and an access point in an 802.11 wireless LAN.

WEP has a prior condition that the client and the access point share the same key. A method of generating the shared key is not mentioned in WEP, but may be directly input by a user. In other words, a user may input an intrinsic identification number of the access point to the client, such as a personal computer (PC). When the shared key is generated, the access point and the PC transmit and receive encrypted data using the shared key.

An encrypting method using WEP includes performing authentication between devices and authentication of message content.

The shared key in WEP is used for authenticating devices which transmit/receive data. Upon receiving a random number from the access point, the client encodes the random number and responds to the access point. Then, the access point decrypts the encrypted random number and checks whether the result of decrypting is equal to the original random number. Accordingly, it is determined that the client has the shared key. Only then can data be transmitted and received.

Also, WEP includes authenticating a message. To detect if a third party intercepts and changes the message, a cyclic redundancy check (CRC) bit in each 32 bits can be encrypted and transmitted.

According to a related art technology, data is protected and transmitted using WEP during DTCP communication. However, encrypting data using both DTCP and WEP is very inefficient, in a DTCP communication method having a transmission rate of several Gbps.

SUMMARY OF THE INVENTION

The present invention provides a method and apparatus for transmitting data using authentication, which can transmit data while efficiently protecting the data by omitting unnecessary double encrypting processes in DTCP.

According to an aspect of the present invention, there is provided a method of transmitting data using authentication, between a first device and a second device, the method including: encrypting a certificate of the first device using a shared key shared by the first device and the second device, and transmitting the encrypted certificate of the first device to the second device; receiving at the first device authentication key generation information for the first device for generating an authentication key, if it is determined that the certificate of the first device is valid and not revoked; generating at the first device a first random number of the first device; generating at the first device the authentication key based on the first random number and the authentication key generation information for the first device; encrypting content data using the authentication key, at the first device; and transmitting the encrypted content data from the first device to the second device.

The method may further include: generating at the first device a second random number of the first device; encrypting the second random number using the shared key; transmitting the encrypted second random number to the second device; decrypting the encrypted second random number at the second device; and receiving at the first device the decrypted second random number, wherein the generating at the first device the authentication key is performed only if the decrypted second random number is received.

The method may further include: receiving a certificate of the second device at the first device; and generating at the first device a second random number of the first device, wherein the second random number is encrypted along with the certificate of the first device using the shared key, and transmitted along with the encrypted certificate of the first device to the second device, wherein the receiving at the first device the authentication key generation information for the first device comprises receiving data in which the authentication key generation information for the first device, and the second random number encrypted using the shared key are encrypted using a secret key of the second device; and wherein the generating the authentication key comprises decrypting the data, which is encrypted using the secret key of the second device, using a public key of the second device included in the certificate of the second device.

The method may further include: decrypting the encrypted second random number, obtained by decrypting the data encrypted using the secret key of the second device, using the shared key; and determining whether the second random number obtained by the decrypting the encrypted second random number is equal to the generated second random number, wherein the generating of the authentication key is performed only if the second random number obtained by the decrypting the encrypted second random number is equal to the generated second random number.

In the receiving of the authentication key generation information, the authentication key generation information for the first device may be received after being encrypted using the shared key, and the generating at the first device of the authentication key may further include decrypting the encrypted authentication key generation information for the first device using the shared key.

The authentication key generation information for the first device may be generated using a third random number generated by the second device in order to generate the authentication key, and a coordinate of a fixed point on an elliptic curve used for encrypting.

The authentication key may be the product of multiplying the authentication key generation information for the first device by the first random number.

The authentication key may be generated using an X-axis coordinate of the product of multiplying the authentication key generation information for the first device by the first random number.

The certificate of the first device may contain an identification (ID) of the first device, a public key of the first device, and data in which a hash value of the ID of the first device and the public key of the first device are encrypted using a secret key of a certificate authority.

The method may further include determining whether the authentication key generation information for the first device has been altered, wherein the generating at the first device the authentication key is selectively performed based on a result of the determining whether the authentication key generation information for the first device has been altered.

The determining of whether the authentication key generation information for the first device has been altered may include: receiving an electronic signature of the authentication key generation information, wherein the electronic signature comprises data in which the authentication key generation information for the first device and a hash value of the authentication key generation information for the first device are encrypted using a secret key of the second device; decrypting the encrypted authentication key generation information for the first device using a public key of the second device included in the certificate of the second device, and comparing a hash value of the authentication key generation information for the first device obtained by the decrypting the encrypted authentication key generation information for the first device, and the hash value of the authentication key generation information for the first device included in the electronic signature.

In the generating of the authentication key, the authentication key may be generated when it is determined that the authentication key generation information for the first device has not been altered.

The shared key may be a predetermined value set by a user.

The shared key may be an intrinsic identification number of the first device or the second device.

In the encrypting the content data, the content data may be encrypted using one of an advanced encryption standard (AES) Cipher Block Chaining (CBC) mode algorithm and an AES counter mode algorithm.

The method may further include: receiving a certificate of the second device at the first device; determining whether the certificate of the second device is valid and not revoked; and selectively transmitting to the second device authentication key generation information for the second device for generating an authentication key at the second device, based on the result of determination.

In the selective transmitting of the authentication key generation information to the second device, the authentication key generation information for the second device may be transmitted when it is determined that the certificate of the second device is valid and not revoked.

According to another aspect of the present invention, there is provided a method of transmitting data using authentication, between a first device and a second device, the method including: transmitting a certificate of the first device to the second device; receiving at the first device encrypted authentication key generation information for the first device for generating an authentication key if it is determined that the certificate of the first device is valid and not revoked; decrypting the encrypted authentication key generation information; generating a random number, and generating an authentication key based on the random number and the authentication key generation information for the first device obtained by the decrypting the encrypted authentication key generation information for the first device; encrypting content data using the authentication key; and transmitting said encrypted content data from the first device to the second device.

According to another aspect of the present invention, there is provided an apparatus for transmitting data using authentication with a second device, the apparatus including: an encryption unit which encrypts a certificate of the apparatus using a shared key shared by the apparatus and the second device; a transmitter which transmits the encrypted certificate of the apparatus to the second device; a receiver which receives authentication key generation information for the first device for generating an authentication key, if it is determined that the certificate of the apparatus is valid or revoked; a random number generator which generates a first random number of the first device for generating an authentication key; and an authentication key generator which generates the authentication key based on the first random number and the authentication key generation information for the first device, wherein the transmitter transmits to the second device content data encrypted using the authentication key.

The apparatus may further include decryption unit, wherein the receiver receives a certificate of the second device, wherein the random number generator generates a second random number, wherein the encryption unit encrypts the generated second random number and the certificate of the apparatus using the shared key, wherein the transmitter transmits to the second device the second random number and certificate of the apparatus encrypted using the shared key, wherein the receiver receives data in which the authentication key generation information for the first device and the second random number encrypted using the shared key are encrypted using the secret key of the second device, and wherein the decryption unit decrypts the data encrypted using the secret key of the second device, using a public key of the second device included in the certificate of the second device, to extract the authentication key generation information for the first device and the encrypted second random number.

The apparatus may further include a random number comparator which determines whether the second random number obtained by decrypting the encrypted second random number and the generated second random number are identical, and wherein the authentication key generator generates the authentication key only if the second random number obtained by decrypting the encrypted second random number and the generated second random number are identical.

The apparatus may further include a decryption unit which decrypts an encrypted authentication key generation information, wherein the decryption unit performs the decryption, when the receiver receives the authentication key generation information encrypted using the shared key, wherein the authentication key generator generates the authentication key based on the decrypted authentication key generation information and the first random number.

The apparatus may further include a certificate determiner which determines whether a certificate of the second device is valid or revoked, when the receiver receives the certificate of the second device, wherein the transmitter selectively transmits the authentication key generation information for generating the authentication key based on the result of determination by the certificate determiner.

According to another aspect of the present invention, there is provided a computer readable recording medium having recorded thereon a program for executing a method of transmitting data using authentication, between a first device and a second device, the method including: encrypting a certificate of the first device using a shared key shared by the first device and the second device, and transmitting the encrypted certificate of the first device to the second device; extracting at the second device the certificate of the first device by decrypting the encrypted certificate of the first device; receiving at the first device authentication key generation information for the first device for generating an authentication key, if it is determined that the certificate of the first device is valid and not revoked; generating at the first device a first random number of the first device; generating at the first device the authentication key based on the first random number and the authentication key generation information for the first device; encrypting content data using the authentication key, at the first device; and transmitting the encrypted content data from the first device to the second device.

BRIEF DESCRIPTION OF THE DRAWINGS

The above and other aspects of the present invention will become more apparent by describing in detail exemplary embodiments thereof with reference to the attached drawings in which:

FIG. 4 is a flowchart of a method of transmitting data using authentication between a first device and a second device according to an exemplary embodiment of the present invention; and FIG. 5 is a block diagram of an apparatus for transmitting data using authentication with a second device according to an exemplary embodiment of the present invention.

DETAILED DESCRIPTION OF EXEMPLARY EMBODIMENTS

The present invention will now be described more fully with reference to the accompanying drawings, in which exemplary embodiments of the invention are shown.

Figure 1:
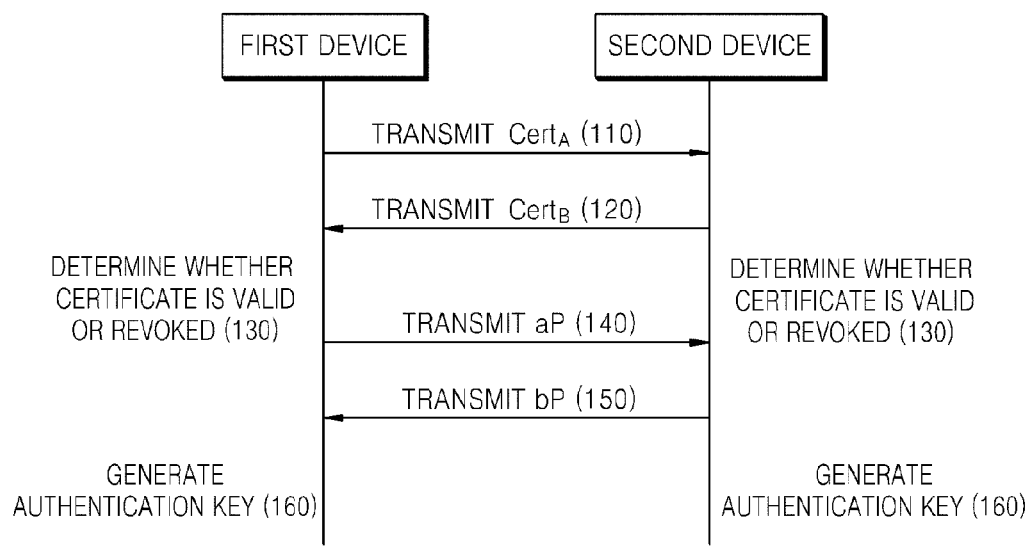
FIG. 1 is diagram of a related art method of generating a DTCP authentication key.

FIG. 1 is a diagram of a related art method of generating a DTCP authentication key.

In operation 110, a first device transmits a certificate $Cert_A$ of the first device to a second device.

In operation 120, the second device transmits a certificate $Cert_B$ of the second device to the first device.

In operation 130, the first device and the second device determine whether the received certificates $Cert_A$ and $Cert_B$ are valid or revoked.

Here, a certificate may be formed of an ID of a device, a public key of the device, and data in which a result value of hashing the ID of the device and the public key of the device is encrypted using a secret key of a certificate authority.

For example, the certificate $Cert_A$ of the first device can be expressed by Equation 1.

$$ID_A | K_{pub_A} | E_{K_{Cert}}[H(ID_A | K_{public_A})] \quad (1)$$

Here, $ID_A$ denotes an ID of the first device, $K_{pub_A}$ denotes a public key of the first device, and $E_{K_{cert}}[H(ID_A|K_{public_A})]$ denotes data in which a result value of hashing the ID $ID_A$ of the first device and the public key $K_{pub_A}$ of the first device is encrypted using a secret key $K_{cert}$ of a certificate authority.

When the first device and the second device receive a certificate of a counterpart, the first device and the second device decrypt data in which an ID and a public key of the counterpart are encrypted. Then, when a hash of the decoded ID and public key of the counterpart is identical to a hash of an ID and public key of the counterpart included in the certificate, the validity of the certificate of the counterpart is acknowledged. In other words, it is determined that the received ID and the public key are the ID and public key of the counterpart.

The form of a certificate is not limited to Equation 1 above, and may vary. Also, the validity of a certificate can be determined using an elliptic curve-digital signature algorithm (EC-DSA).

Here, the certificate of the counterpart can be determined to be invalid or revoked based on a certificate revocation list.

When it is determined that the certificate $Cert_B$ of the second device is valid or revoked in operation 130, the first device generates a random number a, generates authentication key generation information aP by multiplying the random number a by a coordinate P of a fixed point on an elliptic curve used for encrypting, and then transmits the authentication key generation information aP to the second device in operation 140.

Here, the elliptic curve used for encrypting is a set of points satisfying a predetermined equation. Generally, an elliptic curve satisfying a Weierstrass Equation is used for encrypting. Since an encrypting method using such an elliptic curve is obvious to one of ordinary skill in the art, its detailed description thereof will be omitted here.

When it is determined that the certificate $Cert_A$ of the first device is valid or revoked in operation 130, the second device generates a random number b, generates authentication key generation information bP by multiplying the random number b by a coordinate P of a fixed point on an elliptic curve used for encrypting, and then transmits the authentication key generation information bP to the first device in operation 150.

Here, the authentication key generation information is denoted as aP or bP, where the random number a or b is multiplied by the coordinate P of a fixed point on an elliptic curve, for convenience of description. However, in detail, the authentication key generation information is the result of a predetermined calculation using the random number a or b and the coordinate P of a fixed point on an elliptic curve.

A method of generating such authentication key generation information is obvious to one of ordinary skill in the art, and thus its detailed description will be omitted here.

In operation 160, the first device and the second device generate an authentication key.

The first device generates an authentication key $K_{AUTH}$ as shown in Equation 2, by multiplying the received authentication key generation information bP and the random number a.

$$K_{AUTH}=(bP)a=abP \quad (2)$$

Also, the second device generates an authentication key $K_{AUTH}$ as shown in Equation 3, by multiplying the received authentication key generation information aP and the random number b.

$$K_{AUTH}=(aP)b=abP \quad (3)$$

The authentication key $K_{AUTH}$ may be induced from an X-axis coordinate of abP.

A method of inducing an authentication key $K_{AUTH}$ from an X-axis coordinate of abP is obvious to one of ordinary skill in the art, and thus its detailed description will be omitted here.

Through the above processes, the first device and the second device have the same authentication key $K_{AUTH}$. At this time, even when a third person steals the authentication key generation information aP and bP, the authentication key $K_{AUTH}$ cannot be calculated if the third person does not know the random numbers a and b.

Meanwhile, the first and second devices can transmit information related to a certificate revocation list with the authentication key generation information aP and bP in operations 140 and 150. The information related to a certificate revocation list may be about a version of a certificate revocation list.

As described above, the related art method of generating an authentication key of DTCP only determines whether a counterpart device is included in a certificate revocation list. Accordingly, when data is transmitted only using DTCP, privacy may be violated because the data can be transmitted or received without any restriction between devices having a DTCP-IP function.

For example, if a user's house has a settop box having a DTCP-IP function and the user's neighbor owns a television (TV) having a DTCP-IP function, the neighbor's TV can receive content from my settop box. In order to solve this problem, data is encrypted again using WEP while transmitting the data using DTCP.

Figure 2:
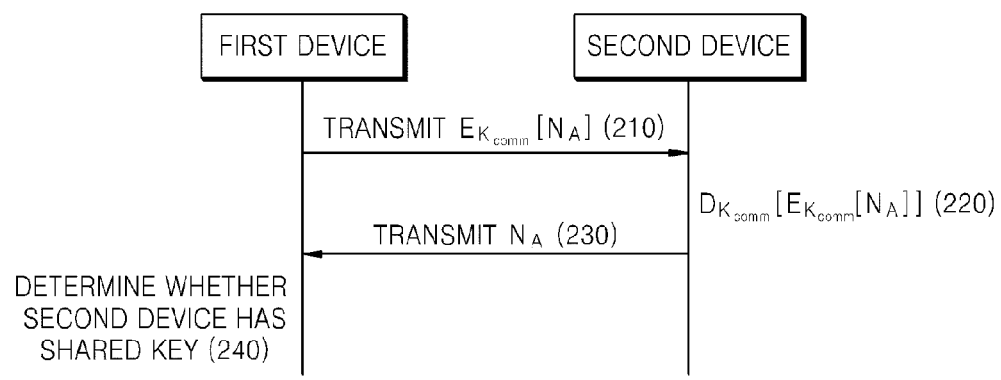
FIG. 2 is a diagram of a related art encrypting method using WEP.

FIG. 2 is a diagram of a related art encrypting method using WEP.

In operation 210, a first device generates a random number $N_A$, encodes the random number $N_A$ using a shared key $K_{comm}$ shared by the first device and a second device, and transmits the encrypted random number $E_{K_{comm}}[N_A]$ to the second device.

In operation 220, the second device decodes the received encrypted random number $E_{K_{comm}}[N_A]$ using the shared key $K_{comm}$.

In operation 230, the second device transmits the decrypted random number $N_A$ to the first device.

In operation 240, the first device compares whether the random number $N_A$ decrypted and received from the second device is identical to the random number $N_A$ that was transmitted to the second device, and determines whether the second device has the shared key $K_{comm}$.

Here, the shared key $K_{comm}$ is a predetermined value shared by the first and second devices, and can be set by a user. For example, when the user sets the shared key $K_{comm}$ to be a password 2580, the first and second devices encrypts data to be transmitted using the password 2580 as the shared key $K_{comm}$.

Also, the shared key $K_{comm}$ may be an intrinsic identification number of the first or second device. For example, when the first device is a PC and the second device is an access point, an intrinsic identification number of the access point is input to the PC, and then the PC and the access point encrypts data to be transmitted using the intrinsic identification number of the access point as the shared key $K_{comm}$.

According to an exemplary embodiment of the present invention, the encrypting method using WEP is applied to a method of generating an authentication key $K_{AUTH}$ of DTCP, and thus the authentication key $K_{AUTH}$ of DTCP is generated when the first and second devices have the shared key $K_{comm}$.

However, the encrypting method using WEP described with reference to FIG. 2 may vary.

For example, the first device generates the random number $N_A$ and transmits the generated random number $N_A$ to the second device. Then, the second device encrypts the received random number $N_A$ using the shared key $K_{comm}$ and transmits the encrypted random number $N_A$ to the first device. Then, the first device compares the encrypted random number $N_A$ and the generated random number $N_A$, and when they are the same, the first device determines that the second device has the shared key $K_{comm}$.

Figure 3:
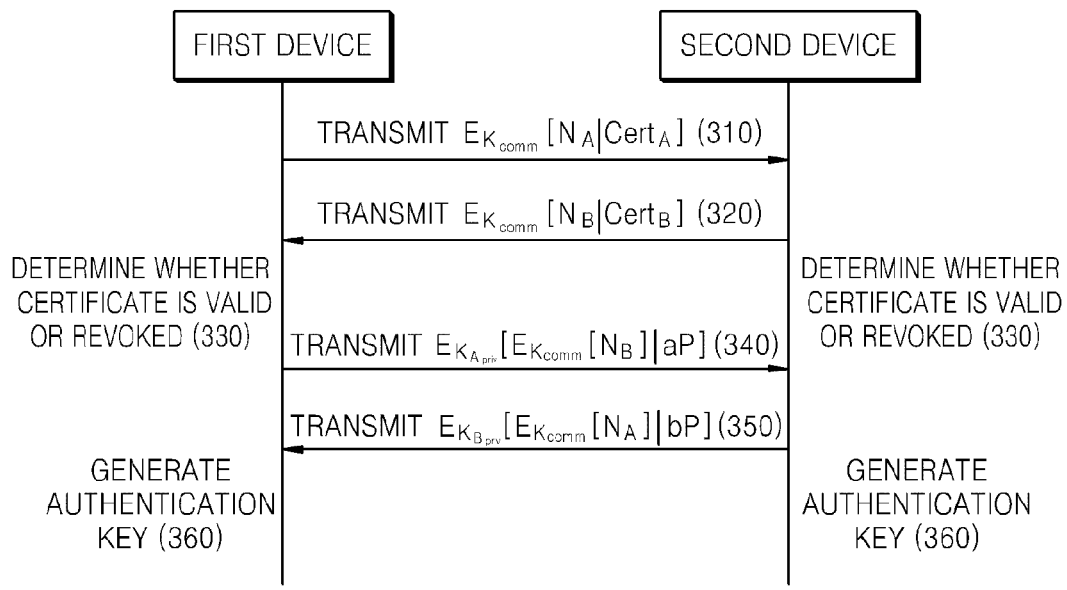
FIG. 3 is a diagram of a method of generating an authentication key according to an exemplary embodiment of the present invention.

FIG. 3 is a diagram of a method of generating an authentication key $K_{AUTH}$ according to an exemplary embodiment of the present invention;

In operation 310, a first device generates a random number $N_A$, encrypts the random number $N_A$ and a certificate $Cert_A$ of the first device using a shared key $K_{comm}$ shared by the first device and a second device, and transmits the encrypted data $E_{K_{comm}}[N_A|Cert_A]$ to the second device.

Here, only the random number $N_A$ may be encrypted, and the certificate $Cert_A$ may not be encrypted. Also, neither the random number $N_A$ nor the certificate $Cert_A$ may be encrypted.

One reason for encrypting the certificate $Cert_A$, etc. using the shared key $K_{comm}$ before the transmission is that data encrypted using the shared key $K_{comm}$ can only be decrypted by a device having the shared key $K_{comm}$. Accordingly, only a device having the shared key $K_{comm}$ can generate the authentication key $K_{AUTH}$.

Here, the first device may encrypt and transmit the certificate $Cert_A$ without the random number $N_A$. In the current exemplary embodiment, the first device generates the random number $N_A$ and transmits the random number $N_A$ to the second device with the certificate $Cert_A$ in operation 310 in order to determine whether the second device has the shared key $K_{comm}$ using the random number $N_A$. This will be described in detail in operations 340 and 350.

In operation 320, the second device generates a random number $N_B$, encrypts the random number $N_B$ and a certificate $Cert_B$ of the second device using the shared key $K_{comm}$, and transmits the encrypted data $E_{K_{comm}}[N_B|Cert_B]$ to the first device.

In operation 330, the first and second devices determine whether the received certificate $Cert_A$ or $Cert_B$ is valid or revoked.

The first device extracts the certificate $Cert_B$ by decrypting the encrypted data $E_{K_{comm}}[N_B|Cert_B]$ received from the second device, and determines whether the extracted certificate $Cert_B$ is valid or revoked.

Here, when each of the certificates $Cert_A$ and $Cert_B$ is not encrypted, the decrypting process may be omitted.

When it is determined that the certificate $Cert_B$ is valid and not revoked in operation 330, the first device generates a random number a, generates authentication key generation information aP by multiplying the random number a by a coordinate P of a fixed point on an ellipse curve used for an encrypting, encrypts the random number $N_B$ received from the second device using the shared key $K_{comm}$, and transmits data $$E_{K_{A_{priv}}}[E_{K_{comm}}[N_B] | aP],$$

in which the authentication key generation information aP and the random number $E_{K_{comm}}[N_B]$ encrypted using the shared key $K_{comm}$ are encrypted using a secret key $K_{A_{priv}}$ of the first device, to the second device in operation 340.

When the random number $E_{K_{comm}}[N_B]$ encrypted using the shared key $K_{comm}$ is transmitted to the second device in operation 340, the second device decodes the encrypted random number $E_{K_{comm}}[N_B]$ using the shared key $K_{comm}$, and thus obtains the random number $N_B$. When the obtained random number $N_B$ and the generated random number $N_B$ are identical, the second device determines that the first device has the shared key $K_{comm}$. Here, when it is determined that the first device has the shared key $K_{comm}$, the second device generates the authentication key $K_{AUTH}$ as described later.

One reason for transmitting data encrypted using the secret key $K_{A_{priv}}$ of the first device to the second device is to confirm the second device that the first device has the secret key $K_{A_{priv}}$.

In other words, when data encrypted using the secret key $K_{A_{priv}}$ of the first device is transmitted to the second device, the second device checks that the data is decrypted using the secret key $K_{A_{priv}}$ in order to confirm that the first device has the secret key $K_{A_{priv}}$.

One reason for checking whether the first device has the secret key $K_{A_{priv}}$ is to prevent a third party from masquerading as the first device and intruding during the authentication process.

In this case, the first device may transmit the authentication key generation information aP that is not encrypted to the second device, or transmit authentication key generation information $E_{K_{comm}}[aP]$ encrypted using the shared key $K_{comm}$ to the second device.

When it is determined that the certificate $Cert_A$ is valid and not revoked in operation 330, the second device generates a random number b, generates authentication key generation information bP by multiplying the random number b by a coordinate P of a fixed point on an ellipse curve used for an encrypting, encrypts the random number $N_A$ received from the first device using the shared key $K_{comm}$, and transmits data $$E_{K_{B_{priv}}}[E_{K_{comm}}[N_A] | bP],$$

in which the authentication key generation information bP and the random number $E_{K_{comm}}[N_A]$ encrypted using the shared key $K_{comm}$ are encrypted using a secret key $K_{B_{priv}}$ of the second device, to the first device in operation 350.

The random number $N_A$ is encrypted using the shared key $K_{comm}$ before the transmission, and transmitted data is encrypted using the secret key $K_{B_{priv}}$, for the same reasons as described in operation 340.

In this case, the second device may transmit the authentication key generation information bP unencrypted, or transmit authentication key generation information $E_{K_{comm}}[bP]$ encrypted using the shared key $K_{comm}$, to the first device.

In operation 360, the first and second devices generate the authentication key $K_{AUTH}$.

Here, when the authentication key generation information bP is encrypted, the first device decodes the authentication key generation information bP using the shared key $K_{comm}$, and generates the authentication key $K_{AUTH}$ by multiplying the decrypted authentication key generation information bP and the self-generated random number a.

Also, when the authentication key generation information aP is encrypted, the second device decodes the authentication key generation information aP using the shared key $K_{comm}$, and generates the authentication key $K_{AUTH}$ by multiplying the decrypted authentication key generation information aP and the self-generated random number b.

The encrypting method using WEP described in FIG. 2 may be applied to one of operations 310 through 360.

For example, the first device may determine whether the second device has the shared key $K_{comm}$, and operation 310 may begin only when it is determined that the second device has the shared key $K_{comm}$.

As described above, the encrypting method using WEP is applied to all or part of the method of generating the authentication key $K_{AUTH}$ of DTCP, and thus the process of generating the authentication key $K_{AUTH}$ can be performed by devices having the shared key $K_{comm}$.

Once the authentication key $K_{AUTH}$ has been obtained using the WEP encrypting method, data can be encrypted using only DTCP, and thus the data can be protected and transmitted more effectively than by the conventional technology.

FIG. 4 is a flowchart of a method of transmitting data using authentication between a first device and a second device according to an exemplary embodiment of the present invention.

In operation 410, a certificate of the first device is transmitted after being encrypted using a shared key shared by the first and second devices.

At this time, the certificate of the first device may not be encrypted.

When it is determined that the certificate of the first device is valid and not revoked, authentication key generation information for generating an authentication key is received in operation 420.

This will now be described in more detail.

When the first device transmits the encrypted certificate of the first device to the second device, the second device decrypts the encrypted certificate of the first device and determines whether the decrypted certificate of the first device is valid or revoked. When it is determined that the certificate of the first device is valid and not revoked, the second device transmits its own authentication key generation information to the first device.

At this time, the authentication key generation information may be encrypted before the transmission.

Operation 420 may further determine whether the received authentication key generation information has been altered.

For example, when an electronic signature of the authentication key generation information is received, the encrypted authentication key generation information is decrypted using a public key of the second device. The decrypted authentication key generation information and the authentication key generation information included in the electronic signature are compared, and when they are identical, it can be determined that the authentication key generation information has not been altered.

Here, the electronic signature is formed of the authentication key generation information, and data in which the authentication key generation information is encrypted using a secret key of the second device. Also, the public key of the second device is included in a certificate of the second device.

In operation 430, a random number is generated, and an authentication key is generated using the random number and the authentication key generation information.

When operation 420 further determines whether the authentication key generation information has been altered, the authentication key is generated only when it is determined that the authentication key generation information has not been altered.

In operation 440, data is encrypted using the generated authentication key and then the encrypted data is transmitted.

Here, an encrypting method such as an advanced encryption standard (AES) Cipher Block Chaining (CBC) mode algorithm, an AES counter mode algorithm, or the like may be used to encrypt the data. The encrypting method is not limited to above.

Meanwhile, according to another exemplary embodiment, a user may selectively determine whether the encrypting method using WEP is to be applied to the method of generating an authentication key of DTCP or whether data is to be encrypted again using WEP when the data is to be transmitted using DTCP.

FIG. 5 is a block diagram of an apparatus for transmitting data using authentication with a second device according to an exemplary embodiment of the present invention.

Referring to FIG. 5, the apparatus includes an encryption unit 510, a transmitter 520, a random number generator 530, an authentication key generator 540, and a receiver 550.

The encryption unit 510 encrypts a certificate and a random number of the apparatus using a shared key shared by the apparatus and the second device. Also, the encryption unit 510 may encrypt predetermined data using a secret key of the apparatus.

The transmitter 520 transmits the encrypted certificate of the apparatus.

Alternatively, the transmitter 520 may transmit the certificate of the apparatus unencrypted.

The random number generator 530 generates a random number for generating an authentication key.

Also, the random number generator 530 may generate a random number for determining whether the second device has the shared key.

The process of determining whether the second device has the shared key is as follows.

First, when the random number generator 530 generates a random number $N_A$, the encryption unit 510 encrypts the random number $N_A$ using the shared key, and transmits the encrypted random number $N_A$ to the second device.

Then, when the random number $N_A$, which was encrypted and transmitted to the second device, is decrypted and received from the second device, it can be determined that the second device has the shared key.

Also, as described above, it can be determined whether the second device has the shared key by the opposite processes.

That is, when the random number generator 530 generates the random number $N_A$ and transmits the random number $N_A$ to the second device, the second device encrypts the random number $N_A$ using the shared key and transmits the encrypted random number $N_A$ to the first device.

The first device decrypts the encrypted random number $N_A$ using the shared key and determines whether the decrypted random number $N_A$ and the self-generated random number $N_A$ are identical. When they are identical, it can be determined that the second device has the shared key.

Preferably, but not necessarily, the apparatus may further include a random number comparator (not shown) which determines whether the decrypted random number $N_A$ and the self-generated random number $N_A$ are identical.

The apparatus performs an authentication process only when the random number comparator determines that the random numbers $N_A$ are identical.

Also, the apparatus may further include a decryption unit (not shown) which decrypts the encrypted random number $N_A$ when the encrypted random number $N_A$ is received.

The receiver 550 receives authentication key generation information for generating an authentication key which is received when it is determined that the certificate of the apparatus is valid and not revoked.

Also, the receiver 550 receives a certificate of the second device.

Preferably, but not necessarily, when the receiver 550 receives the certificate of the second device, the apparatus further includes a certificate determiner (not shown) which determines whether the certificate of the second device is valid or revoked.

The apparatus performs an authentication process only when the certificate determiner determines that the certificate of the second device is valid and not revoked.

Meanwhile, the receiver 550 may receive encrypted authentication key generation information. At this time, the decryption unit decrypts the encrypted authentication key generation information, and the authentication key generator 540 uses the decrypted authentication key generation information.

The decryption unit may use a public key of the second device to decrypt data encrypted using a secret key of the second device.

Preferably, but not necessarily, the apparatus further includes an authenticator (not shown) which determines whether the received authentication key generation information has been altered.

The authentication key generator 540 generates an authentication key only when the authenticator determines that the authentication key generation information has not been altered.

The authentication key generator 540 generates an authentication key based on the random number generated from the random number generator 530 and the authentication key generation information received from the receiver 550.

Finally, the transmitter 520 encrypts data using the authentication key generated by the authentication key generator 540, and transmits the encrypted data.

The exemplary embodiments of the present invention can be written as computer programs and can be implemented in general-use digital computers that execute the programs using a computer readable recording medium. Examples of the computer readable recording medium include magnetic storage media (e.g. ROM, floppy disks, hard disks, etc.), optical recording media (e.g. CD-ROMs, or DVDs), and storage media.

According to the exemplary embodiments of the present invention, data can be efficiently protected and transmitted by transmitting a certificate of a first device encrypted using a shared key shared by the first device and a second device, receiving authentication key generation information for generating an authentication key, which is received when it is determined that the certificate of the first device is valid and not revoked, generating a random number, generating an authentication key based on the random number and the authentication key generation information, and encrypting the data using the authentication key.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of transmitting data using authentication between a first device and a second device, the method comprising:
   encrypting a certificate of the first device using a shared key shared by the first device and the second device, and transmitting the encrypted certificate of the first device to the second device;
   receiving at the first device, authentication key generation information for the first device for generating an authentication key, if it is determined that the certificate of the first device is valid and not revoked;
   determining whether the authentication key generation information for the first device has been altered, wherein the determining of whether the authentication key generation information for the first device has been altered comprises:
      receiving an electronic signature of the authentication key generation information, wherein the electronic signature comprises data in which the authentication key generation information for the first device and a hash value of the authentication key generation information for the first device are encrypted using a secret key of the second device;
      decrypting the encrypted authentication key generation information for the first device using a public key of the second device included in the certificate of the second device, and
      comparing a hash value of the authentication key generation information for the first device obtained by the decrypting the encrypted authentication key generation information for the first device, and the hash value of the authentication key generation information for the first device included in the electronic signature;
   generating at the first device, a first random number of the first device;
   generating at the first device, the authentication key based on the first random number and the authentication key generation information for the first device;
   encrypting content data using the authentication key, at the first device; and
   transmitting the encrypted content data from the first device to the second device.

2. The method of claim 1, further comprising:
   generating at the first device, a second random number of the first device;
   encrypting the second random number using the shared key;
   transmitting the encrypted second random number to the second device;
   decrypting the encrypted second random number at the second device; and
   receiving at the first device, the decrypted second random number,
   wherein the transmitting the encrypted certificate of the first device is performed only if the decrypted second random number is received.

3. The method of claim 1, further comprising:
   receiving a certificate of the second device at the first device; and
   generating at the first device, a second random number of the first device,
   wherein the second random number is encrypted along with the certificate of the first device using the shared key, and transmitted along with the encrypted certificate of the first device to the second device,
   wherein the receiving at the first device the authentication key generation information for the first device comprises receiving data in which the authentication key generation information for the first device, and the second random number encrypted using the shared key are encrypted using a secret key of the second device; and
   wherein the generating the authentication key comprises decrypting the data, which is encrypted using the secret key of the second device, using a public key of the second device included in the certificate of the second device.

4. The method of claim 3, further comprising:
   decrypting the encrypted second random number, obtained by decrypting the data encrypted using the secret key of the second device, using the shared key; and
   determining whether the second random number obtained by the decrypting the encrypted second random number is equal to the generated second random number,
   wherein the generating of the authentication key is performed only if the second random number obtained by the decrypting the encrypted second random number is equal to the generated second random number.

5. The method of claim 1, wherein the authentication key generation information for the first device is encrypted using the shared key, and wherein the generating at the first device the authentication key comprises decrypting the encrypted authentication key generation information for the first device using the shared key.

6. The method of claim 1, wherein the authentication key generation information for the first device is generated using a third random number generated by the second device in order to generate the authentication key, and a coordinate of a fixed point on an elliptic curve used for encrypting.

7. The method of claim 1, wherein the authentication key is a product of multiplying the authentication key generation information for the first device by the first random number.

8. The method of claim 6, wherein the authentication key is generated using an X-axis coordinate of the product of multiplying the authentication key generation information for the first device by the first random number.

9. The method of claim 1, wherein the certificate of the first device comprises an identification (ID) of the first device, a public key of the first device, and data in which a hash value of the ID of the first device and the public key of the first device are encrypted using a secret key of a certificate authority.

10. The method of claim 1, further comprising receiving a certificate of the second device at the first device.

11. The method of claim 1, wherein the generating at the first device the authentication key is performed if it is determined that the authentication key generation information for the first device has not been altered.

12. The method of claim 1, wherein the shared key is a value set by a user.

13. The method of claim 1, wherein the shared key is an intrinsic identification number of the first device or the second device.

14. The method of claim 1, wherein the encrypting the content data comprises encrypting the content data using one of an advanced encryption standard (AES) Cipher Block Chaining (CBC) mode algorithm and an AES counter mode algorithm.

15. The method of claim 1, further comprising:
receiving a certificate of the second device at the first device;
determining whether the certificate of the second device is valid and not revoked; and
selectively transmitting to the second device authentication key generation information for the second device for generating an authentication key at the second device, based on a result of the determining.

16. The method of claim 15, wherein the selectively transmitting to the second device the authentication key generation information for the second device is performed if it is determined that the certificate of the second device is valid and not revoked.

17. A method of transmitting data using authentication between a first device and a second device, the method comprising:
transmitting a certificate of the first device to the second device;
receiving at the first device, encrypted authentication key generation information for the first device for generating an authentication key if it is determined that the certificate of the first device is valid and not revoked;
determining whether the authentication key generation information for the first device has been altered, wherein the determining of whether the authentication key generation information for the first device has been altered comprises:
  receiving an electronic signature of the authentication key generation information, wherein the electronic signature comprises data in which the authentication key generation information for the first device and a hash value of the authentication key generation information for the first device are encrypted using a secret key of the second device;
  decrypting the encrypted authentication key generation information for the first device using a public key of the second device included in the certificate of the second device, and
  comparing a hash value of the authentication key generation information for the first device obtained by the decrypting the encrypted authentication key generation information for the first device, and the hash value of the authentication key generation information for the first device included in the electronic signature;
decrypting the encrypted authentication key generation information;
generating a random number, and generating an authentication key based on the random number and the authentication key generation information for the first device obtained by the decrypting the encrypted authentication key generation information for the first device;
encrypting content data using the authentication key; and
transmitting said encrypted content data from the first device to the second device.

18. An apparatus for transmitting data using authentication with a second device; the apparatus comprising:
an encryption unit which encrypts a certificate of the apparatus using a shared key shared by the apparatus and the second device;
a transmitter which transmits the encrypted certificate of the apparatus to the second device;
a receiver which receives authentication key generation information for the first device for generating an authentication key, if it is determined that the certificate of the apparatus is valid or revoked;
a determining unit utilizing a processor for determining whether the authentication key generation information for the first device has been altered, wherein the determining of whether the authentication key generation information for the first device has been altered comprises:
  receiving an electronic signature of the authentication key generation information, wherein the electronic signature comprises data in which the authentication key generation information for the first device and a hash value of the authentication key generation information for the first device are encrypted using a secret key of the second device;
  decrypting the encrypted authentication key generation information for the first device using a public key of the second device included in the certificate of the second device, and
  comparing a hash value of the authentication key generation information for the first device obtained by the decrypting the encrypted authentication key generation information for the first device, and the hash value of the authentication key generation information for the first device included in the electronic signature;
a random number generator which generates a first random number of the first device for generating an authentication key; and
an authentication key generator which generates the authentication key based on the first random number and the authentication key generation information for the first device,
wherein the transmitter transmits to the second device content data encrypted using the authentication key.

19. The apparatus of claim 18, wherein the random number generator generates a second random number,
wherein the encryption unit encrypts the second random number using the shared key,
wherein the transmitter transmits the encrypted second random number to the second device,
the receiver receives data in which the encrypted second random number is decrypted at the second device, and
the transmitter transmits the encrypted certificate of the apparatus to the second device only if the second random number decrypted at the second device is received.

20. The apparatus of claim 18, further comprising a decryption unit,
wherein the receiver receives a certificate of the second device,
wherein the random number generator generates a second random number,
wherein the encryption unit encrypts the generated second random number and the certificate of the apparatus using the shared key,
wherein the transmitter transmits to the second device the second random number and certificate of the apparatus encrypted using the shared key,
wherein the receiver receives data in which the authentication key generation information for the first device and the second random number encrypted using the shared key are encrypted using the secret key of the second device, and
wherein the decryption unit decrypts the data encrypted using the secret key of the second device, using a public key of the second device included in the certificate of the second device, to extract the authentication key generation information for the first device and the encrypted second random number.

21. The apparatus of claim 20, further comprising a random number comparator which determines whether the decrypted second random number and the generated second random number are identical, and
wherein the authentication key generator generates the authentication key only if the second random number obtained by decrypting the encrypted second random number and the generated second random number are identical.

22. The apparatus of claim 18, further comprising a decryption unit which decrypts an encrypted authentication key generation information,
wherein the decryption unit performs the decryption, if the receiver receives the authentication key generation information encrypted using the shared key, and
wherein the authentication key generator generates the authentication key based on the decrypted authentication key generation information and the first random number.

23. An apparatus for transmitting data using authentication with a second device, the apparatus comprising:
a transmitter which transmits a certificate of the apparatus to the second device;
a receiver which receives data in which authentication key generation information for the first device for generating an authentication key is encrypted using a shared key shared by the apparatus and the second device, if it is determined that the certificate of the apparatus is valid or revoked;
a determining unit utilizing a processor determining whether the authentication key generation information for the first device has been altered, wherein the determining of whether the authentication key generation information for the first device has been altered comprises:
receiving an electronic signature of the authentication key generation information, wherein the electronic signature comprises data in which the authentication key generation information for the first device and a hash value of the authentication key generation information for the first device are encrypted using a secret key of the second device;
decrypting the encrypted authentication key generation information for the first device using a public key of the second device included in the certificate of the second device, and
comparing a hash value of the authentication key generation information for the first device obtained by the decrypting the encrypted authentication key generation information for the first device, and the hash value of the authentication key generation information for the first device included in the electronic signature;
a decryption unit which decrypts the encrypted authentication key generation information for the first device;
a random number generator which generates a random number for generating the authentication key; and
an authentication key generator which generates the authentication key based on the random number and the authentication key generation information for the first device decrypted by decryption unit,
wherein the transmitter transmits to the second device content data encrypted using the authentication key.

24. A non-transitory computer readable recording medium having recorded thereon a program for executing a method of transmitting data using authentication between a first device and a second device, the method comprising:
encrypting a certificate of the first device using a shared key shared by the first device and the second device, and transmitting the encrypted certificate of the first device to the second device;
extracting at the second device, the certificate of the first device by decrypting the encrypted certificate of the first device;
receiving at the first device, authentication key generation information for the first device for generating an authentication key, if it is determined that the certificate of the first device is valid and not revoked;
determining whether the authentication key generation information for the first device has been altered, wherein the determining of whether the authentication key generation information for the first device has been altered comprises:
receiving an electronic signature of the authentication key generation information, wherein the electronic signature comprises data in which the authentication key generation information for the first device and a hash value of the authentication key generation information for the first device are encrypted using a secret key of the second device;
decrypting the encrypted authentication key generation information for the first device using a public key of the second device included in the certificate of the second device, and
comparing a hash value of the authentication key generation information for the first device obtained by the decrypting the encrypted authentication key generation information for the first device, and the hash value of the authentication key generation information for the first device included in the electronic signature;
generating at the first device, a first random number of the first device;
generating at the first device, the authentication key based on the first random number and the authentication key generation information for the first device;
encrypting content data using the authentication key, at the first device; and
transmitting the encrypted content data from the first device to the second device.

* * * * *